(12) United States Patent
Buard

(10) Patent No.: US 6,663,199 B1
(45) Date of Patent: Dec. 16, 2003

(54) HOUSING FOR DEVICES TO BE DISPOSED ALONG TRUNKING, IN PARTICULAR ELECTRICAL DEVICES

(75) Inventor: Yvon Buard, Voutre (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 102 days.

(21) Appl. No.: 09/813,860

(22) Filed: Mar. 22, 2001

(30) Foreign Application Priority Data

Mar. 24, 2000 (FR) .......................................... 00 03784

(51) Int. Cl.[7] ................................................ H02G 3/10
(52) U.S. Cl. ...................... 312/223.6; 174/48; 220/3.2
(58) Field of Search ........................... 312/223.6, 223.1, 312/205; 174/48, 49, 50, 58, 60; 220/3.2, 3.3, 3.8, 3.92, 3.94, 4.02; 52/220.5, 220.7, 220.8

(56) References Cited

U.S. PATENT DOCUMENTS

| 3,721,762 | A | * | 3/1973 | Gooding | 174/48 |
| 5,421,646 | A | * | 6/1995 | McNamara et al. | 312/205 |
| 5,486,650 | A | * | 1/1996 | Yetter | 174/53 |
| 5,629,496 | A | * | 5/1997 | Navazo | 174/48 |
| 5,747,733 | A | * | 5/1998 | Woods et al. | 174/48 |
| 5,753,856 | A | * | 5/1998 | Benito Navazo | 174/50 |
| 5,981,872 | A | * | 11/1999 | Decore et al. | 174/48 |
| 5,998,732 | A | * | 12/1999 | Caveney et al. | 174/48 |
| 6,350,948 | B1 | * | 2/2002 | Decore et al. | 174/48 |
| 6,353,181 | B1 | * | 3/2002 | Jarry et al. | 174/48 |

FOREIGN PATENT DOCUMENTS

| EP | 159554 | * | 10/1985 |
| EP | 239456 | * | 9/1987 |
| EP | 0267079 | * | 5/1988 |
| FR | 2 595 513 | | 9/1987 |
| GB | 2237454 | * | 5/1991 |
| GB | 2266414 | * | 10/1993 |

* cited by examiner

Primary Examiner—Lanna Mai
Assistant Examiner—Hanh V. Tran
(74) Attorney, Agent, or Firm—Young & Thompson

(57) ABSTRACT

A housing for devices to be disposed along trunking, projecting from a wall includes a frame which is attached to the wall to form the housing for the device, an opening along one side which adjoins the trunking and a canopy which extends from the frame in corresponding relationship with the opening to cover the trunking locally and transversely. The canopy has a mobile part provided with two parallel arms which are slidably mounted inside the frame so that the mobile part of the canopy can be located relative to the frame telescopically in a series of predefined stable positions corresponding to different widths of trunking.

15 Claims, 3 Drawing Sheets

HOUSING FOR DEVICES TO BE DISPOSED ALONG TRUNKING, IN PARTICULAR ELECTRICAL DEVICES

BACKGROUND OF THE INVENTION

1. Field of the Invention

The present invention relates generally to installing devices, and more particularly electrical devices, along trunking projecting from a wall and housing and protecting electrical conductors or cables connected to the devices.

In the present context the term "trunking" has the usual meaning of a duct including a base section which is adapted to be applied to the wall and has an open cross section and a cover section which is attached to the base section, for example clipped to it, to close it.

The form of trunking referred to in the present context generally has small dimensions and is also referred to as a molding.

The present invention is directed more particularly to the situation in which devices are installed along trunking by means of a housing including a frame which is adapted to be attached to the wall and to form the housing for the device concerned and has an opening along one side which in use extends alongside the trunking and a canopy which extends from the frame, in corresponding relationship with the opening, and is adapted to cover the trunking locally, in practice extending transversely over the base section of the trunking, between two lengths of cover section.

One of the problems to be overcome in making this kind of housing is that trunking is available in various widths and heights.

2. Description of the Prior Art

To solve this problem, the document FR 2 595 513 proposes dissociating the canopy from the frame of the housing and inserting it to a greater or lesser distance into the frame, according to the width or height of the trunking.

However, for any surplus length of the canopy inside the housing not to interfere with the other components therein it is necessary to cut the canopy accordingly, to cut off the surplus length, which commensurately complicates installation.

The document EP 0 633 639 proposes a canopy that can be removed from the frame of the housing, whose width matches the width or height of the trunking to which the housing is to be attached, and which has on one edge clips which cooperate with the edge of the opening in the frame of the housing to fasten the canopy to the frame. This implies that a canopy matching one trunking width or height can be substituted for another canopy matching a different trunking width or height.

However, this leads to costly multiplication of fabrication, which is to the detriment of the overall cost of the system.

A general object of the present invention is an arrangement of the frame and the canopy of the housing that avoids the disadvantages referred to above.

SUMMARY OF THE INVENTION

To be more precise, the invention provides a housing for devices to be disposed along trunking projecting from a wall, which housing includes a frame adapted to be attached to the wall and to form the housing for the device, an opening along one side adapted to adjoin the trunking and a canopy which extends from the frame in corresponding relationship with the opening to cover the trunking locally and transversely, which canopy has a mobile part provided with two parallel arms which are slidably mounted inside the frame so that the mobile part of the canopy can be located relative to the frame telescopically in a series of predefined stable positions corresponding to different widths of trunking.

Accordingly, it is sufficient to adjust the position of the mobile part of the canopy relative to the frame to adapt the length of the canopy to the width or height of the associated trunking.

According to one particularly advantageous feature of the housing according to the invention, each arm of the mobile part of the canopy includes an abutment adapted to cooperate with an abutment at the end of a flexible blade fastened to the frame and facing toward the corresponding arm.

The cooperating abutments advantageously constitute fastening and guiding means for the mobile part of the canopy and the frame which enable final assembly of the two parts of the housing, in particular during fabrication of the housing. This also facilitates fitting of the combination by the installer, reduces the overall size of the combination to be packaged, and facilitates packaging it.

According to another preferred feature of the housing according to the invention, the canopy has a fixed part fastened to the frame.

In particular, the fixed part of the canopy is formed with the frame and includes a front part which extends from the opening of the frame over some of the height of the front wall of the frame of the housing and two lateral walls each extending a lateral wall of the frame of the housing and the mobile part of the canopy has a front wall with two parallel lateral edges extended by the arms and an end wall extending perpendicularly to the front wall from its front edge opposite the arms, the front wall of the mobile part of the canopy being adapted to slide under the front wall of its fixed part.

Accordingly, any surplus length of the mobile part of the canopy is advantageously concealed under its fixed part, without projecting into the frame of the housing, and thus without interfering with other components present in the housing.

Other advantageous and non-limiting features of the housing in accordance with the invention are as follows:

one of the front walls of the fixed and mobile parts of the canopy includes a series of notches staggered over its height and the other of the front walls includes a rib adapted to cooperate with the notches to locate the mobile part of the canopy in a series of stable positions relative to its fixed part;

the notches are provided on an inside face of the front wall of the fixed part of the canopy and the rib projects a small distance from an outside face of the front wall of its mobile part;

one of the front walls of the fixed and mobile parts of the canopy includes a series of ribs staggered over its height and the other of the front walls includes a notch adapted to cooperate with the ribs to locate the mobile part of the canopy in a series of stable positions relative to its fixed part;

the notch is provided on an inside face of the front wall of the fixed part of the canopy and the ribs project a small distance from an outside face of the front wall of its mobile part;

the fixed part of the canopy is fastened to the frame and includes a front wall extending the front wall of the frame of the housing, the height of the front wall corresponding to the width of the trunking in order to close the trunking locally and transversely, and the mobile part has an end wall from which the arms extend perpendicularly, the end wall being adapted to be placed at the free end of the front wall, perpendicularly thereto;

the arms and the frame are provided with complementary immobilizing means to define a series of stable positions of the mobile part of the canopy relative to the frame, corresponding to different widths of the associated trunking;

the complementary immobilizing means include notches provided at different heights on outside edges of the arms and adapted to cooperate with a rib provided on an inside face of each of the corresponding lateral walls of the frame;

notches provided at different heights on inside faces of corresponding lateral walls of the frame cooperate with a knob provided on an outside edge of each of the arms;

the complementary immobilizing means include a series of detents provided on the arms cooperating with two complementary abutments formed at the end of two flexible blades provided on the frame and facing the arms;

the frame has a front opening for a portion of the device accessible to user and each arm has a width matching that of a space between an inside face of one lateral edge of the front opening and the inside face of the lateral wall of the frame facing the corresponding lateral edge so that the interior space forms a groove in which the arm slides; and the arms slide in grooves formed on inside faces of the two lateral walls of the frame.

The following description with reference to the accompanying drawings, which are provided by way of non-limiting example, explains in what the invention consists and how it can be put into effect.

DETAILED DESCRIPTION OF THE PREFERRED EMBODIMENTS

As shown in the figures, and as known in the art, the overall aim is to dispose electrical devices, not shown, along trunking 10 projecting from a wall, not shown, using a housing 1 for this purpose.

Figure 3:
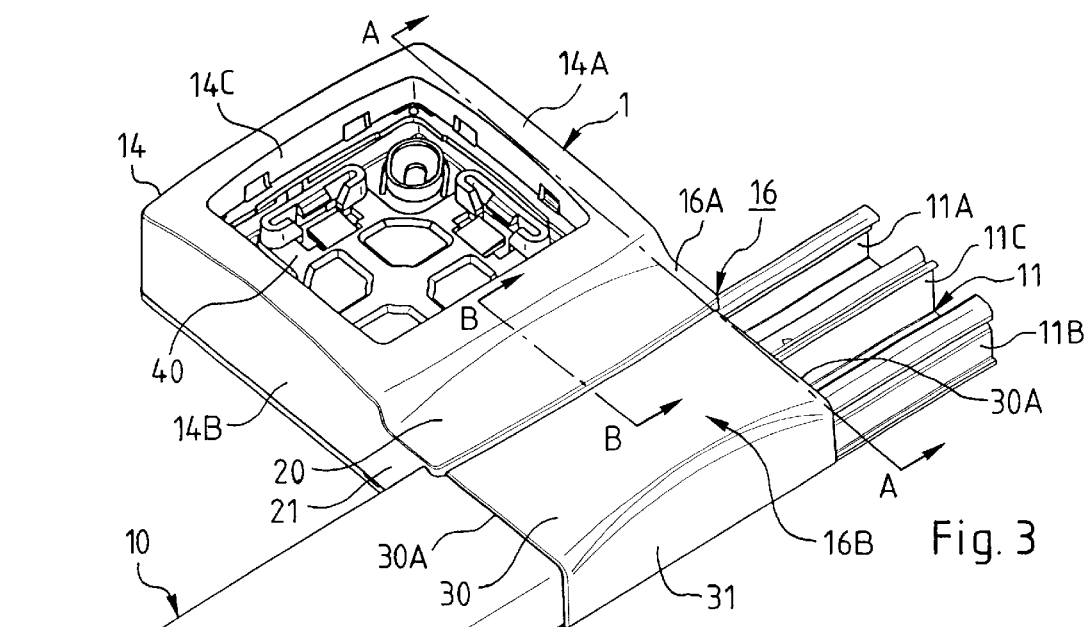
FIG. 3 is a top perspective view of the housing shown in FIGS. 1 and 2 when fitted to trunking.

This arrangement is shown in FIG. 3 in particular.

In the embodiment shown in FIG. 3, and in a manner that is known in the art, the trunking 10 includes a base section 11 which is adapted to be attached to the wall and has an open cross section and a cover section 12 which is attached to the base section 11, for example clipped to it, to close it.

The base section 11 of the trunking is delimited laterally by two longitudinal flanges 11A, 11B and its interior space is longitudinally divided into two equal parts by a central wall 11C whose upper edge is substantially level with the rims on the longitudinal flanges 11A, 11B.

In this embodiment the cover section 12 is of the overlapping type, i.e. it includes upstanding rims 12A, 12B which cover the outside faces of the lateral flanges 11A, 11B of the base section 11 of the trunking 10.

The housing 1 is generally used between two lengths of cover section. FIG. 3 shows only one length.

As shown in the figures, the housing 1 includes a frame 14 adapted to be attached to the wall (not shown) alongside the trunking 10 to form the housing for the device concerned, and more particularly for the mechanism of that device. It has an opening 15 along one side adjoining the trunking 10 and a canopy 16 which extends from the frame 14, to be more precise from the upper part of the opening 15 therein, and is adapted to cover the trunking 10 locally, in practice extending transversely over the base section 11 of the trunking 10 between two lengths of its cover section 12 (see FIG. 3 in particular).

The frame 14 has a front wall 14A provided with a front opening 14C for a portion of the device accessible to the user, two parallel lateral walls 14B and a rear wall (no reference number).

The housing 1 is completed by a plate 40 by means of which the combination is attached to the wall (see FIG. 3 in particular). The frame 14 caps said plate 40 to form the housing for the device concerned. The plate forms a support adapted to receive the device mechanism and is fastened to the frame by a system of clips or the like.

Referring to FIGS. 1 to 6 in particular, the canopy 16 of the housing 1 has a fixed part 16A fastened to the frame 14 and a mobile part 16B which has two parallel arms 17 which slide inside the frame so that the position of the mobile part 16B of the canopy 16 relative to the frame 14, and to be more precise relative to the fixed part 16A of the canopy, can be adjusted telescopically, with a series of predefined stable positions corresponding to different widths of trunking.

In the embodiment shown in FIGS. 1 to 6, the fixed part 16A of the canopy 16 is formed with the frame 14 of the housing and includes a front wall 20 which extends from the opening 15 in the frame 14, or to be more precise from the upper part of the opening 15, over some of the height of the front wall 14A of the frame 14 of the housing 1, and two lateral walls 21 each extending one of two parallel lateral walls 14B of the frame 14 of the housing.

The mobile part 16B of the canopy 16 has a front wall 30 whose two parallel lateral edges 30A are extended by arms 17 and an end wall 31 perpendicular to the front wall 30 and extending from its front edge opposite the arms. The front wall 30 of the mobile part 16B of the canopy is adapted to slide under the front wall 20 of its fixed part 16A.

As shown in FIG. 3 in particular, the front walls 20 and 30 of the fixed and mobile parts 16A and 16B of the canopy 16 and the end wall 31 of the mobile part 16B are adapted to provide a continuous wall between the lengths of cover section 12. The end wall 31 of the mobile part 16B of the canopy 16 covers the upstanding rims of the adjacent lengths of cover section 12.

Figure 1:
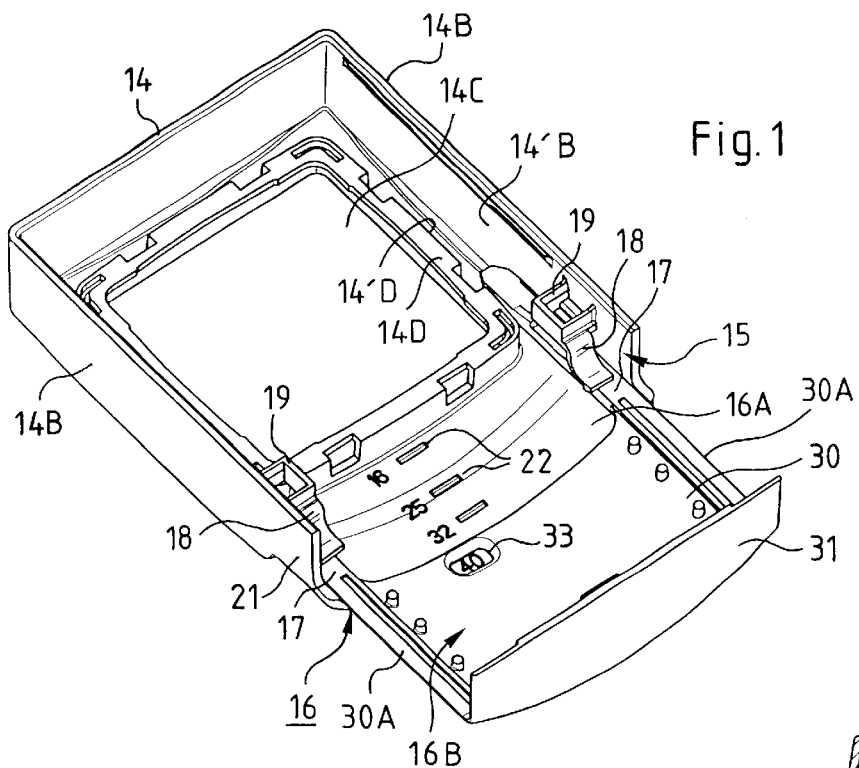
FIG. 1 is a bottom perspective view of a frame and a canopy of one embodiment of a housing according to the invention, a mobile part of the canopy being deployed as far as possible relative to a fixed part.
Figure 2:
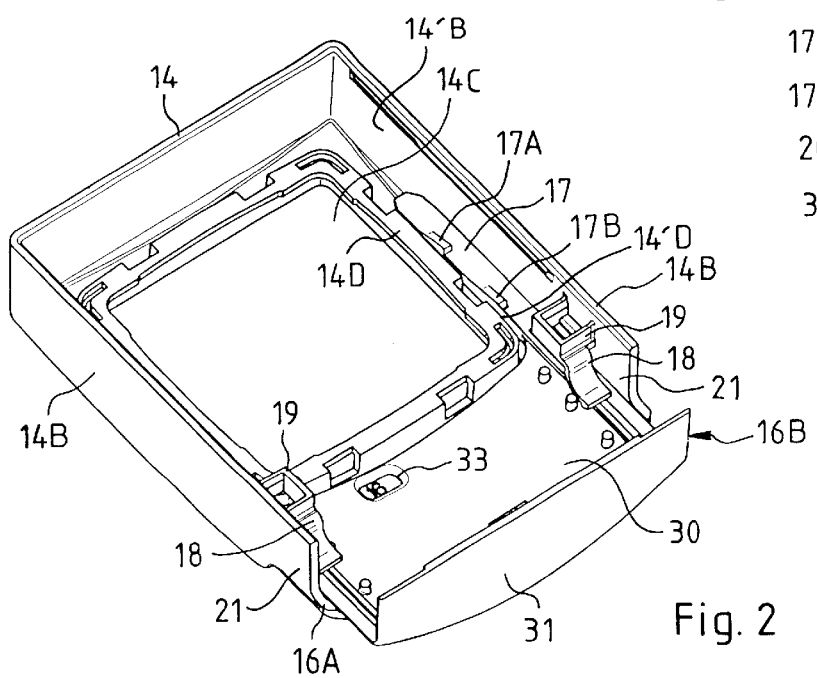
FIG. 2 is a view identical to that of FIG. 1 except that the mobile part of the canopy is inserted as far as possible into the frame of the housing.
Figure 5:
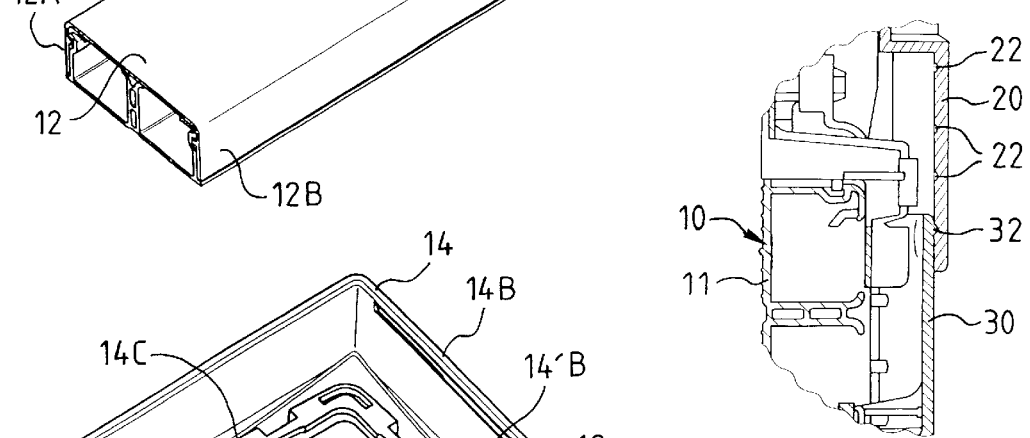
FIG. 5 is a view in section taken along the line B—B in FIG. 3.

In the embodiment shown in FIGS. 1, 2 and 5 in particular, the inside face of the front wall 20 of the fixed part 16A of the canopy 16 includes a series of notches 22 staggered over its height and the outside face of the front wall 30 of the mobile part 16B of the canopy 16 includes a rib 32 projecting a short distance and adapted to cooperate with the notches 22 to locate the mobile part 16B of the canopy 16 in a series of stable positions relative to its fixed part 16A.

The inside face of the front wall 20 of the fixed part 16A of the canopy 16 advantageously carries a numerical indication of the width or height of the canopy facing the notches 22 on that inside face. In this example there are four canopy widths or heights, corresponding to four widths or heights of the associated trunking or molding. A window 33 is additionally provided in the front wall 30 of the mobile part 16B of the canopy 16 to show the numerical indication of the canopy width or height when the mobile part of the canopy is located in one of the four predefined stable positions relative to its fixed part.

Accordingly, in FIG. 1, the mobile part 16B of the canopy 16 is in one extreme position, corresponding to the greatest canopy width or height and bearing the numerical indication 40, and in FIG. 2 the mobile part 16B of the canopy 16 is in an opposite extreme position, corresponding to the smallest canopy width or height and bearing the numerical indication 16.

Two intermediate positions between the minimum and maximum extreme positions bear the numerical indications 25 and 32 and correspond to two other standard trunking widths or heights.

Of course, in other embodiments, not shown, other complementary immobilizing means can be provided to define the series of stable positions of the mobile part of the canopy relative to the frame, to be more precise relative to the fixed part of the canopy attached to the frame, and corresponding to different widths or heights of the associated trunking.

According to a first of those variants, one of the front walls of the fixed and mobile parts of the canopy can incorporate a series of ribs staggered over its height and the other of the front walls can incorporate a notch adapted to cooperate with the ribs to locate the mobile part of the canopy in one of a series of stable positions relative to its fixed part.

In this case, the notch is preferably on the inside face of the front wall of the fixed part of the canopy and the ribs preferably project a small distance from the outside face of the front wall of its mobile part.

The complementary immobilizing means can equally include notches provided at different heights on the outside edges of the arms of the mobile part of the canopy and cooperating with a rib provided on each of the inside faces of the corresponding parallel lateral walls of the frame.

The complementary immobilizing means can equally include notches provided at different heights on the inside face of the corresponding lateral walls of the frame and cooperating with a rib provided on each of the outside edges of the arms.

The complementary immobilizing means can equally include a series of detents provided on the corresponding arms with two complementary abutments formed at the end of two flexible blades provided on the frame and facing the arms.

Figure 4:
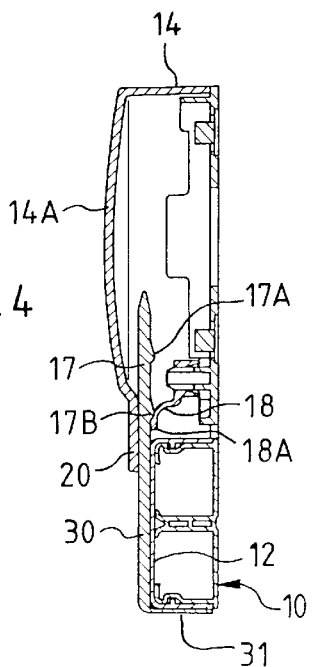
FIG. 4 is a view in section taken along the line A—A in FIG. 3

As shown in FIGS. 2 and 4 in particular, the arms 17 advantageously include two staggered abutments on the side facing toward the plate of the housing. The first abutment 17A is near the free end of the corresponding arm and the second abutment 17B is at a greater distance from that free end. The abutments 17A, 17B are adapted to cooperate with an abutment 18A at the end of a flexible blade 18 fastened to the frame 14 and facing toward the corresponding arm 17.

Each flexible blade 18 is fastened to the frame 14 by a bracket 19 in the form of a frame projecting from the inside face 14'B of each lateral wall 14B of the frame 14 and near the opening 15 of the frame. Each flexible blade 18 is in the general shape of a swan-neck so that its upper part facing toward an arm 17 is substantially plane and parallel to the arm and carries the abutment 18A at its free end.

The flexible blades could of course have other suitable shapes.

The cooperating abutments 17A, 17B, 18A advantageously constitute means for fastening and guiding the fixed and mobile parts 16A, 16B of the canopy 16.

The first abutment 17A near the free end of each arm 17 is used for final assembly of the mobile part 16B of the canopy to the frame 14 of the housing (to be more precise to the fixed part 16A of the canopy fastened to the frame) during fabrication. This facilitates installation of the combination by the installer, reduces the overall size of the housing/canopy combination to be packaged, and thereby facilitates packaging it.

Figure 6:
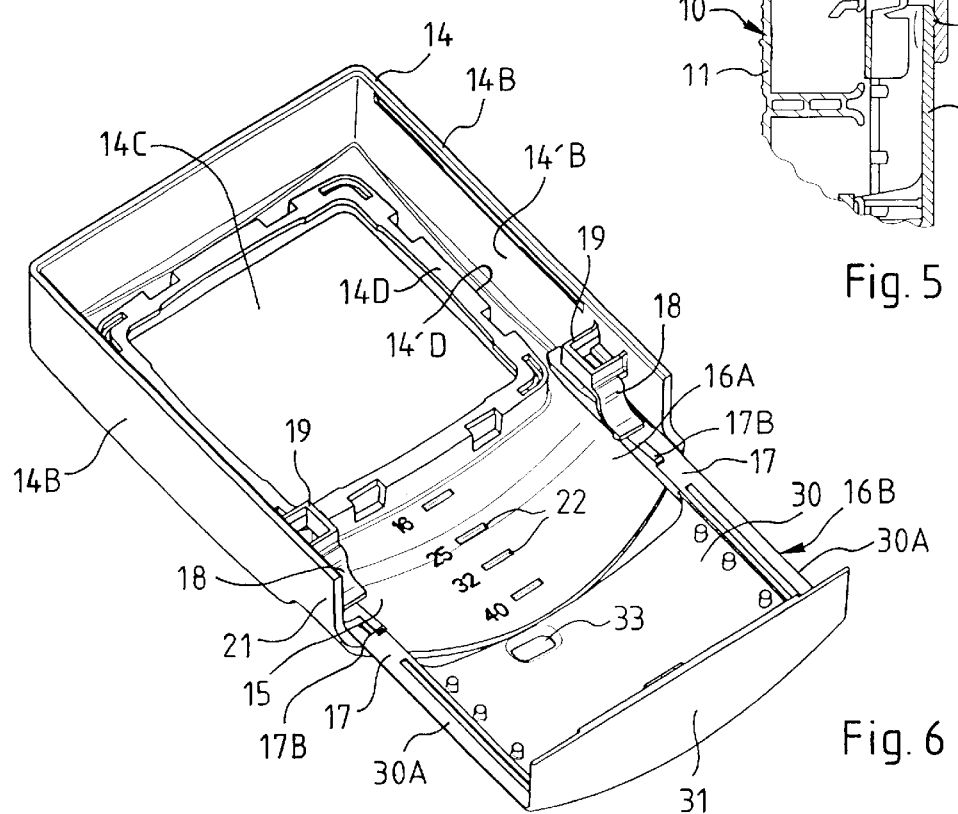
FIG. 6 is a view identical to those of FIGS. 1 and 2 but wit the mobile part of the canopy assembled to the frame of the housing on leaving the manufacturing plant.

The assembled position of the fixed and mobile parts of the canopy during fabrication of the housing is shown in FIG. 6 in particular. Note that the flexible blades 18 cooperate with the abutments 17A near the free ends of the corresponding arms, as explained above.

When the installer wishes to position the housing alongside the trunking, he pushes the mobile part 16B of the canopy 16 into the frame 14 of the housing so that, by virtue of elastic deformation of the flexible blade 18, the abutments 17A pass those carried by the flexible blades, and the abutments 17B carried by the arms then cooperate with the abutments 18A carried by the flexible blades 18, the cooperating abutments defining the extreme position for the greatest canopy width, corresponding to the numerical indication 40.

As an alternative to this, only the abutments 17B are provided on the arm 17, in which case the housing is shipped after fabrication with the mobile part of the canopy in the extreme position for the greatest canopy width.

In use, the flexible blades 18 on the frame 14 of the housing make the assembly highly elastic. Because of the elasticity of the flexible blades 18, the mobile part 16B of the canopy 16 can adopt an angle relative to its fixed part 16A or relative to the frame 14 on either side of its aligned position.

This has the advantage of accommodating defects in the flatness of the surface on which the housing is installed.

What is more, as can be seen in FIGS. 1 and. 2 in particular, each arm 17 advantageously has a width matching that of the space between the inside face 14'D of one lateral edge 14D of the front opening 14C of the frame of the housing and the inside face 14'B of the lateral wall 14B of the frame 14 facing the corresponding lateral edge 14D, so that the interior space forms a groove in which the arm 17 slides.

In this way no additional sliding means for the arm are needed inside the frame of the housing.

The surplus length of the front wall 30 of the mobile part 16B of the canopy is advantageously retracted under the front wall 20 of its fixed part 16A and the arms 17 slide in a pre-existing space of the frame 14 of the housing. The mobile part 16B of the canopy therefore does not interfere with other components inside the housing.

In a different embodiment, not shown, the arms 17 could of course slide in grooves formed on the inside faces of the two parallel lateral walls of the frame of the housing.

Figure 7:
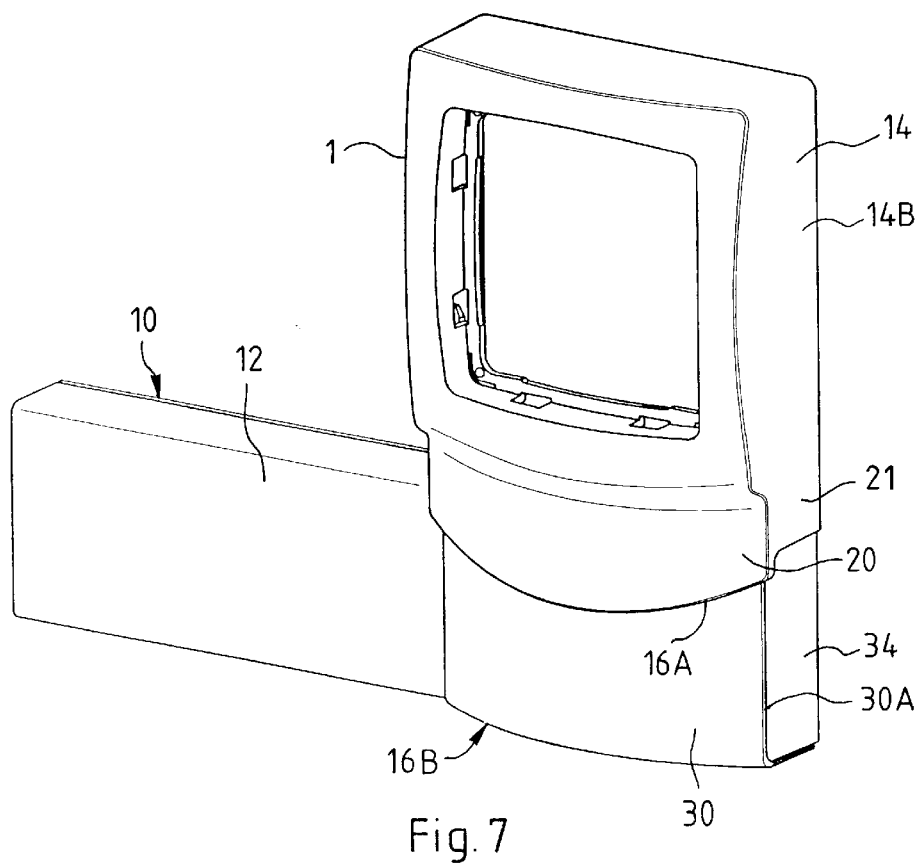
FIG. 7 shows a different embodiment of the housing according to the invention fitted to the end of trunking.

In an embodiment shown in FIG. 7 in particular, when the housing 1 is positioned at the end of trunking 10, a closure wall is advantageously provided, referred to as the end wall 34, positioned on one lateral side of the mobile part 16B of the canopy adjusted to the width of the trunking and establishing continuity with a lateral wall 14B of the frame 14 of the housing to close that end of the trunking.

The end wall 34 can be attached to or formed in one piece with the mobile part 16B of the canopy 16.

Figure 8:
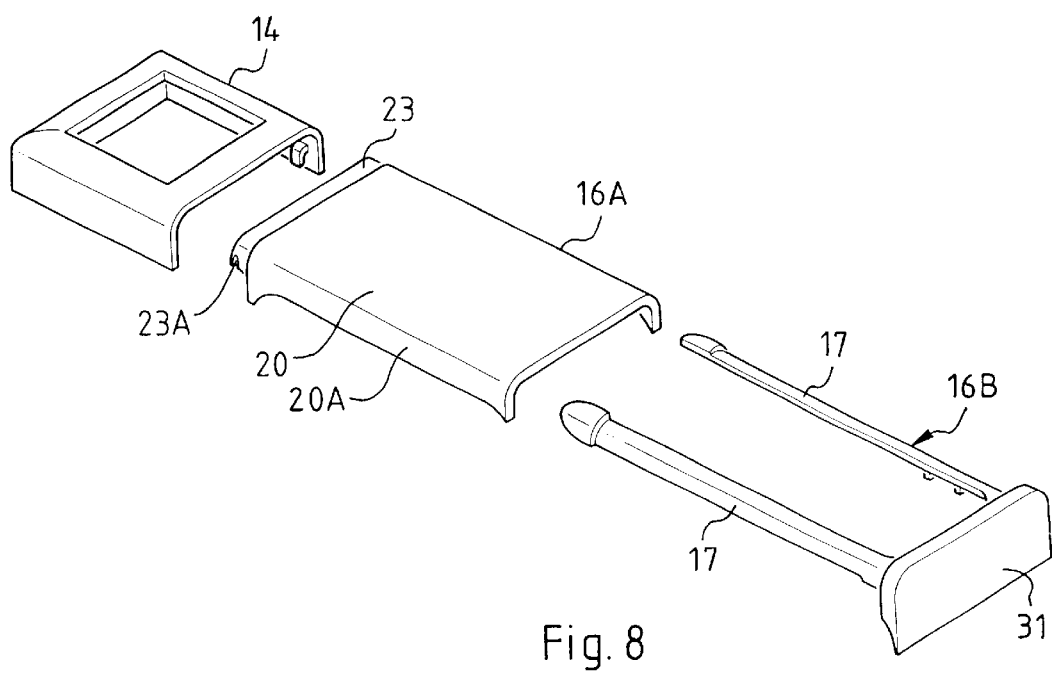
FIG. 8 shows another embodiment of the housing according to the invention.

FIG. 8 shows another embodiment of the housing according to the invention in which the fixed part 16A of the canopy 16 is attached to the frame 14. The fixed part 16A has a front wall 20 extending the front wall 14A of the frame 14 of the housing 1. The height of the front wall corresponds to the width of the associated trunking (not shown) to close the trunking locally and transversely. The front wall 20 has at one end that has a step 23 which cooperates with the frame 14 and fits in the opening 15 in the frame 14 of the housing. It has notches 23A in its lower part for attaching the frame 14 and the fixed part 16A of the canopy.

The front wall 20 of the fixed part 16A of the canopy 16 has longitudinal upstanding edges 20A adapted to cover the length of cover section placed on the trunking in question.

In this embodiment, the mobile part 16B of the canopy 16 has an end wall 31 from which the arms 17 extend perpendicularly. The end wall 31 is adapted to be placed at the free end of the front wall 20 of the fixed part, perpendicularly to it, to ensure local continuity with a lateral flange of the base section of the trunking or with an upstanding rim of a length of cover section.

As already described, the arms 17 are provided with immobilizing means cooperating with complementary means provided on the frame of the housing to immobilize the assembly in position.

The fixed part 16A of the canopy is made in several lengths, one for each width or height of the associated trunking, and the travel of the mobile part 16B of the canopy is further optimized, being limited only by the length of the frame 14 of the housing.

The parts of the housing are molded from plastics material, of course.

The arms and the end and front walls of the mobile part of the canopy are molded from a plastics material in one piece.

The present invention is no way limited to the embodiments described and shown, and variants thereof conforming to the spirit of the invention will suggest themselves to the skilled person.

What is claimed is:

1. A housing for devices to be disposed along trunking projecting from a wall, which housing includes a frame adapted to be attached to such a wall and to form the housing for the device, an opening along one side adapted to adjoin the trunking and a canopy having a first part extending from said frame in alignment with said opening to cover said trunking locally and transversely, said canopy having a second, mobile part provided with two protruding parallel arms which are slidably mounted inside said frame, said mobile part of said canopy being telescopically locatable relative to said frame in any of a series of predefined stable positions corresponding to different widths of trunking.

2. The housing claimed in claim 1 wherein each arm of said mobile part of said canopy includes an abutment adapted to cooperate with an abutment at the end of a flexible blade fixed relative to said frame and facing toward said corresponding arm.

3. The housing claimed in claim 1 wherein said first part of said canopy is fixed relative to said frame.

4. The housing claimed in claim 3 wherein said fixed part of said canopy is integral with said frame and includes a front part which extends from said opening of said frame over some of the height of a front wall of said frame and two lateral walls each extending a lateral wall of said frame and said second mobile part of said canopy has a front wall with two parallel lateral edges extended by said protruding arms and an end wall extending perpendicularly to said front wall from its front edge opposite said arms, said front wall of said mobile part of said canopy being adapted to slide under said front wall of said first fixed part.

5. The housing claimed in claim 4 wherein said front wall of one of said fixed and mobile parts of said canopy includes a series of notches staggered over its height and the front wall of the other of said fixed and module parts includes a rib adapted to cooperate with said notches to locate said mobile part of said canopy in a series of stable positions relative to said fixed part.

6. The housing claimed in claim 5 wherein said notches are provided on an inside face of said front wall of said fixed part of said canopy and said rib projects a small distance from an outside face of said front wall of said mobile part.

7. The housing claimed in claim 4 wherein said front wall of one of said fixed and mobile parts of said canopy includes a series of ribs staggered over its height and said front wall of said other of said fixed and mobile parts includes a notch adapted to cooperate with said ribs to locate said mobile part of said canopy in a series of stable positions relative to said fixed part.

8. The housing claimed in claim 7 wherein said notch is provided on an inside face of said front wall of said fixed part of said canopy and said ribs project a small distance from an outside face of said front wall of said mobile part.

9. The housing claimed in claim 3 wherein said fixed part of said canopy is fastened to said frame and includes a front wall extending from said front wall of said frame, the height of said front wall corresponding to the width of said trunking in order cover said trunking locally and transversely, and said mobile part has an end wall from which said arms protrude perpendicularly, said end wall being adapted to be placed at a free end of said front wall, perpendicularly thereto.

10. The housing claimed in claim 1 wherein said arms and said frame are provided with complementary immobilizing means to define a series of stable positions of said mobile part of said canopy relative to said frame, corresponding to different widths of the associated trunking.

11. The housing claimed in claim 10 wherein said complementary immobilizing means include notches provided at different heights on outside edges of said arms and adapted to cooperate with a rib provided on an inside face of each corresponding lateral wall of said frame.

12. The housing claimed in claim 10 wherein said complementary immobilizing means include notches provided at different heights on inside faces of corresponding lateral walls of said frame cooperating with a knob provided on an outside edge of each of said arms.

13. The housing claimed in claim 10 wherein said complementary immobilizing means include a series of detents provided on said arms cooperating with two complementary abutments formed at the end of two flexible blades provided on said frame and facing said arms.

14. The housing claimed in claim 1 wherein said frame has a front opening for a portion of said device accessible to a user and each arm has a width matching that of a space between an inside face of one lateral edge of said front opening and said inside face of a lateral wall of said frame facing a corresponding lateral edge so that said interior space forms a groove in which the corresponding arm slides.

15. The housing claimed in claim 1 wherein said arms slide in grooves formed on inside faces of two lateral walls of said frame.

\* \* \* \* \*